United States Patent
Decrop et al.

(10) Patent No.: US 12,131,259 B2
(45) Date of Patent: Oct. 29, 2024

(54) PREDICTING ALTERNATIVE COMMUNICATION BASED ON TEXTUAL ANALYSIS

(71) Applicant: INTERNATIONAL BUSINESS MACHINES CORPORATION, Armonk, NY (US)

(72) Inventors: Clement Decrop, Arlington, VA (US); Tushar Agrawal, West Fargo, ND (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1002 days.

(21) Appl. No.: 17/109,034

(22) Filed: Dec. 1, 2020

(65) Prior Publication Data

US 2022/0172063 A1    Jun. 2, 2022

(51) Int. Cl.
*G06N 3/08*    (2023.01)
*G06F 40/30*    (2020.01)
(Continued)

(52) U.S. Cl.
CPC .............. *G06N 3/084* (2013.01); *G06F 40/30* (2020.01); *G06N 3/044* (2023.01)

(58) Field of Classification Search
CPC ......... G06N 3/084; G06N 3/044; G06F 40/30
See application file for complete search history.

(56) References Cited

U.S. PATENT DOCUMENTS 6,781,920 B2    8/2004    Bates
8,019,065 B2    9/2011    MacFarlane
(Continued)

OTHER PUBLICATIONS

Disclosed Anonymously, "Progressive meeting observation enabling predictive notifications management", ip.com No. IPCOM000259361D, IP.com Electronic Publication Date: Aug. 5, 2019, 4 pages.
(Continued)

*Primary Examiner* — Maikhanh Nguyen
(74) *Attorney, Agent, or Firm* — Rakesh Roy

(57) ABSTRACT

A processor-implemented method for predicting alternative communications based on textual analysis. The method includes building, by machine learning, a model to predict an optimal communication method, whereby the building includes training the model on a knowledge corpus of historic data and user data, and results of previous predictions in similar circumstances. The method further includes intercepting textual communication within communication channels, wherein the intercepting comprises a keyboard capture, a screen capture, or both a keyboard capture and a screen capture. The method further includes identifying, by pattern analysis, sentiment analysis, and textual analysis, topics, sentiments, and participants within the intercepted textual communication. The method further includes predicting, by the model, the optimal communication method, whereby the optimal communication method comprises continuing the textual communication, a video conference or a telephone conference.

20 Claims, 7 Drawing Sheets

(51) Int. Cl.
*G06N 3/044* (2023.01)
*G06N 3/084* (2023.01)

(56) References Cited

U.S. PATENT DOCUMENTS

| | | | |
|---|---|---|---|
| 8,756,514 | B2 | 6/2014 | Jones |
| 9,571,291 | B2 | 2/2017 | Schwagmann |
| 9,762,733 | B1* | 9/2017 | Ramanujaiaha .. H04M 3/42068 |
| 2004/0199580 | A1 | 10/2004 | Zhakov |
| 2007/0124371 | A1* | 5/2007 | Desai ................ H04M 1/72451 |
| | | | 709/204 |
| 2007/0162322 | A1 | 7/2007 | Shahine |
| 2007/0288278 | A1 | 12/2007 | Alexander |
| 2011/0160998 | A1 | 6/2011 | Rissanen |
| 2014/0280097 | A1* | 9/2014 | Lee ....................... G06Q 50/01 |
| | | | 707/723 |
| 2015/0142895 | A1 | 5/2015 | Beran |
| 2018/0005296 | A1* | 1/2018 | Eades ............... G06Q 30/0631 |
| 2019/0013092 | A1* | 1/2019 | Van Halteren ......... G09B 19/00 |

OTHER PUBLICATIONS

Tjan, "Don't Send That Email. Pick up the Phone!", Social Platforms, Nov. 1, 2011, 4 pages, https://hbr.org/2011/11/dont-send-that-email-pick-up-t.html.

White, "Ineffective Meetings Cost Companies up to $283 Billion a Year (So Streamline Collaboration With These Tips)," accessed Apr. 21, 2020, 12 pages, https://www.inc.com/john-white/ineffective-meetings-cost-companies-up-to-283-billion-a-year-streamline-collaboration-with-these-tips.html.

Mell et al., "The NIST Definition of Cloud Computing", Recommendations of the National Institute of Standards and Technology, NIST Special Publication 800-145, Sep. 2011, 7 pages.

Microsoft, "Lync ad hoc meetings and sharing", Lync 2013, Lync Basic 2013, accessed on Dec. 1, 2020, 6 pages, https://support.microsoft.com/en-us/office/lync-ad-hoc-meetings-and-sharing-9746d60f-73e0-4296-90c7-fbbcd917975d?ui=en-us&rs=en-us&ad=us.

* cited by examiner

PREDICTING ALTERNATIVE COMMUNICATION BASED ON TEXTUAL ANALYSIS

BACKGROUND

The present invention relates, generally, to the field of computing and more specifically the field of predicting alternative communications.

Textual communication channels like email, short message service (SMS), instant message (IM), and other real time communication systems are commonly used in work environments because of their immediacy. In many situations, text (only) communication can take longer to resolve, as participating members are inputting their thoughts at different times. These thoughts might create another point of discussion, which might create a new thread, ultimately elongating the time it takes to resolve the issue. Alternative channels of communications such as video conferencing and telephone conferencing allow for quicker issue resolution. Allowing for alternative or optimal communication methods would lead to quicker conflict resolution.

SUMMARY

According to one embodiment, a method, computer system, and computer program product for predicting alternative communications based on textual analysis is provided. The present invention may include a processor-implemented method for predicting alternative communications based on textual analysis. The method comprises building, by machine learning, a model to predict an optimal communication method, whereby the building includes training the model on a knowledge corpus of historic data and user data, and results of previous predictions in similar circumstances. Further provided is intercepting textual communication within communication channels, wherein the intercepting comprises a keyboard capture, a screen capture, or both a keyboard capture and a screen capture. Topics, sentiments, and participants are identified within the intercepted textual communication, using pattern analysis, sentiment analysis, and textual analysis. The method also provides for predicting, by the model, the optimal communication method.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
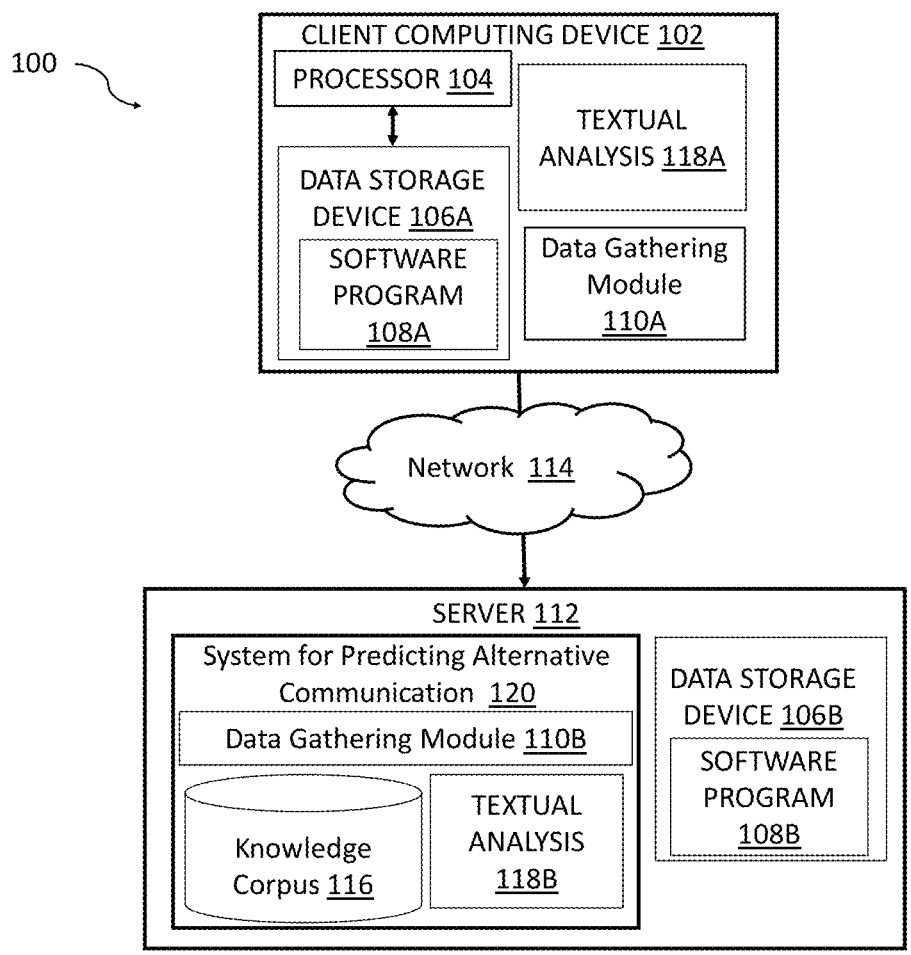
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing and more specifically the field of predicting alternative communications. The following described exemplary embodiments provide a system, method, and program product to, among other things, utilize machine learning such as textual analysis and sentiment analysis to predict whether a phone or video conference would enable users to arrive at issue resolution quicker and save more time than textual communication. Therefore, the present embodiment has the capacity to improve the technical field of computing and more specifically the field of predicting alternative communications by analyzing textual communication and predicting whether an alternative means would save time.

As previously described, textual communication channels like email, short message service (SMS), instant message (IM), and other real time communication systems are commonly used in work environments. These textual communication channels allow interactive text communication between users, especially in situations where people are working from home and/or cannot have the advantage of in-person collaboration. In many situations, issues discussed in text only communication can take longer to resolve, as participating members are inputting their thoughts at different times. These siloed thoughts can lead to another point of discussion, which can create a new issue in another thread—ultimately elongating the time it takes to resolve the original issue. Additionally, many companies utilize forms of person-to-person communication, such as telephone, telecommunication and video conferencing systems, to allow employees to engage in instant interpersonal discussion. Person-to-person communication typically results in quicker issue resolution compared to long form textual communication. Alternative channels of communications such as video conferencing and telephone conferencing allow for quicker issue resolution. As such, it may be advantageous to, among other things, implement machine learning such as a textual analysis and sentiment analysis that predicts and notifies users that time can be saved by switching to a phone call or video conference rather than using textual communication.

According to one embodiment, the predictive system utilizes machine learning to create a model that can be used to predict which communication paths would result in more timely issue resolution. Types of machine learning utilized to identify factors in the communication include textual analysis, sentiment analysis, and historic pattern analysis. These factors include the topic, knowledge level of participants, user sentiment, length of time to resolve past similar issues, and whether or not the resolution may be considered successful. The output of the analysis is a model that can be used to predict whether continued textual communications, telephone/video conferencing, or some combination, would result in quicker issue resolution. Based on the identified topic the model predicts whether either continued textual communication, telephone communication/video conferencing or both would result in quicker issue resolution. The system then generates and sends an overlay to the conversation participants allowing them the option to continue textual communication and/or schedule a phone call or video conference. The overlay may display an estimated amount of time saved by switching to an alternate communication method. If the participants choose to switch to phone or video conference, the predictive system may connect to the participants' calendars, for example through an API in the calendar system, and schedule the meeting.

According to one embodiment, the predictive system utilizes textual analysis and sentiment analysis to identify and evaluate textual identifiers in the textual communications. Textual identifiers may consist of, but are not limited to, screen capture and keyboard capture. Screen capture being a program that allows for identifying text that appears on a user's monitor while keyboard capture is a program that can be used for tracking what a user types into a keyboard. Both methods allow the predictive system to track textual communications within multiple textual applications like email, SMS, IM, or other similar real time messaging. The output of the textual identifier methods provides input to the textual analysis and the sentiment analysis for each of the participants.

The predictive system uses textual analysis. Textual analysis may consist of, but is not limited to, forms of natural language processing along with information retrieval techniques such as a bag of words model or word superiority effect model. The textual analysis identifies factors such as the topic, user knowledge, user sentiment, user knowledge level, time related to past interactions and outcomes of past interactions. The bag of words model can produce a representation that turns arbitrary text into fixed-length vectors by counting how many times each word appears. The bag of words model can be advantageous because it can allow for document classification where the occurrence of each word is used. The word superiority effect model allows for identifying letters within words as compared to isolated letters. The word superiority can distinguish letter combinations whereas the bag of word model focuses on words independently. The textual analysis tracks and documents the interactions noting text related to the aforementioned factors for later topical analysis. The textual analysis will gage when conversations taper off topic as the topic analysis will indicate a change.

The predictive system utilizes sentiment analysis to identify specific emotion levels of the conversation participants. The sentiment analysis can be used to construct an enhanced perspective of user experiences, and is typically used in combination with other natural language processing features. Sentiment is the classification of emotions extracted from a piece of text, speech, or document. Sentiment analysis classifiers divide the spectrum of emotions into positive, negative, and neutral, for example. Sentiment analysis may detect situations of urgency or user discouragement that may factor into a decision in favor of a timelier path for issue resolution such as video or telephone conferencing.

The predictive system utilizes a data gathering module that gathers the discussion thread of any textual interaction in the different textual communication channels. The discussion thread will contextually be analyzed with any existing method of deriving context of topic from textual content. The data gathering module will trigger the remaining steps of the invention.

The predictive system stores historic data in a knowledge corpus. Initially, historic data is loaded into the knowledge corpus from static data that exists in enterprise repositories. As the predictive system executes over time, historic data can be updated to include data that the data the gathering module records, user information, and user preferential data. User information includes data existing in enterprises repositories. This includes email archives, support records, issue tickets, the employee online directory, and calendar information. For instance, the predictive system may weight the knowledge level of a user in a given textual exchange higher or lower based on his area of expertise as stated in the enterprise repository. User preferential data includes data that can be inputted by the user such as preferred paths of communication and threshold parameters. For instance, a user may indicate that textual communication is the default communication method. As another example, a user may preference that if textual communication would take more than five minutes to resolve the issue, then prefer an in person meeting, including phone or video conference.

The data stored in the knowledge corpus may be stored in data clusters, which tend to produce quicker data retrieval and analysis results, particularly as the predictive system grows through acquisition of more data. The data may be sorted into clusters by topic, for example, as related to human resources, finance, or technical support topics. Data clusters may be stored on both one or more servers and in a cloud environment. Certain branches of data that are accessed more often maybe stored to cloud servers for quicker access, while less often accessed data may be stored to servers. Where to store the data may be done by performing a frequency analysis to determine the number of times an event occurs. The predictive system then may create storage bins for each problem. Most frequently encountered problem/topics can be stored in "object storage" (e.g., server memory) or in the fastest and most accessible storage media, and topics of lesser importance stored in slower storage media, until the least referenced data may be stored in archive storage. Positive results are fed back and improves confidence intervals over time and improves cluster data based on frequency of occurrence of topics. When data is stored in clusters in the cloud or in remote servers, pointers can be stored in the knowledge corpus to point to the corresponding cloud computing segment or remote server storing the topic. Additionally, the data clusters maybe stored according to their related users. For instance, the data clusters may identify an external user of the predictive system by IP address and store knowledge based on that IP address to a specific branch of cluster data. This type of storage may be beneficial when an external enterprise frequently interacts with the enterprise, for example, to conduct business. Additionally, the predictive system may be licensed to an outside enterprise. Data stored related to external users can be anonymized to protect personal confidential information.

The predictive system utilizes a model of a recurrent neural network architecture. There are several model architectures that can implement embodiments of the invention. However, the recurrent neural network model will be used to discuss the details. A recurrent neural network model algorithm remembers its input due to an internal memory. This can make it suited for machine learning problems that involve sequential data. The data collected in the knowledge corpus can be used to make the model by either a topical analysis, by breaking down situations based on topic, or by a neural network machine learning and creating a feedback loop based on best results. In the feedback loop, system output can used as input to guide future operation. The results of running the predictive system are recorded to predict best outcomes of future runs. Utilizing topic identification, sentiment analysis, and multiple factors recorded in the knowledge corpus the model will be able to predict which path, textual and/or conferenced communication, would result in the least time for issue resolution. The factors identified by textual analysis are weighted to assist in the running of the model. Factor weights can be assigned initial conditions and can be updated as the model is trained and used in prediction. For instance, if a user resolves issues quicker for certain subject matter over a certain communication path over time the predictive system will weight this communication higher when making its prediction.

Data collected in the knowledge corpus can be used to train the model of the recurrent neural network architecture. The model can be trained by continuously fine-tuning weights by a back-propagation technique based on error rates obtained in previous runs.

A portion of the knowledge corpus can be used for training data. The model can be initially fit on a training dataset, which is a set of examples derived from the knowledge corpus. Training data is static data consisting of initial data gathered through repositors. Training data can be extracted data from various servers/repositories in the enterprise (such as slack and emails). A feedback loop can interactively train the model to a degree of confidence. The feedback loop of the model utilizes past tracked data gathered by the gathering module and stored in the knowledge corpus as output, and can be input to guide future predictions. After reaching a certain user-defined confidence level the model enters a validation phase.

When the trained model meets an agreed upon degree of confidence it enters a validation phase. Validation data can be collected through early runs of the model in order to undergo data cleansing to ensure data quality through trial and error. In the validation phase a feedback loop fine tunes the model by obtaining performance characteristics. Through validation runs the model can configure quality data by obtaining performance characteristics such as accuracy, sensitivity, and specificity.

A small portion of the knowledge corpus can be used as a testing dataset. The testing dataset can be independent of the training dataset, but follow the same probability distribution as the training dataset. The testing dataset can be used to assess the performance of the model. After the model is trained, tested, and validated to a configured level of confidence (for instance 75%) it can be made live. The model will continue to collect live data and correct itself through the feedback. For instance, data gathering analyzes the initial email sent from users to request a meeting, the system analyzes for participants, their roles and knowledge levels, and the context of the content (keywords). The predictive system will record the time an interaction takes and learns through the feedback and will predict future similar interactions to take similar time.

For textual communication, the predictive system will generate an overlay based on the outcome predicted by the model. The overlay displays a recommendation of which communication method will result in quicker issue resolution. The model may predict and display to users that a calculated amount of time can be saved by switching to a phone call or video conference, instead of continuing the textual communication. All the participants engaged in conversation will receive the overlay and recommendation and will have the choice to accept or ignore the recommendation. If the predictive system predicts an alternative other than to continue the textual communication, and users accept the recommendation the predictive system will recommend a time for a conference call based on calendar data of the participants and the calculated time for completion as a length for the meeting. All users must accept the prediction for the conference to be scheduled. The overlay includes the predicted time saved by following the predicted best action. The predictive system will record the outcome of the user and the time allotted to reach that time.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program for predicting alternative communication based on textual analysis that utilizes machine learning model as well as textual analysis and sentiment analysis to identify the factors such as the topic, user knowledge, user sentiment, time related to past interactions, outcomes of past interactions, and processing the identified text through data gathered in a knowledge corpus to predict the most time efficient outcome.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106A that is enabled to host and run a software program 108A such as email or text messaging programs, a data gathering module program 110A, and a textual analysis program 118A to communicate with the server 112 via the communication network 114, in accordance with one embodiment of the invention. Client computing device 102 may be, for example, a mobile device, a personal digital assistant, a netbook, a laptop computer, a tablet computer, a desktop computer, or any type of computing device capable of running a program and accessing a network. As will be discussed with reference to FIG. 5, the client computing device 102 may include internal components 1302a and external components 1304a, respectively.

The server computer 112 may be a laptop computer, netbook computer, personal computer (PC), a desktop computer, or any programmable electronic device or any network of programmable electronic devices capable of hosting and running a system for predicting alternative communication (system) 120 a data gathering module 110B, textual analysis program 118B, and a knowledge corpus 116 communicating with the client computing device 102 via the communication network 114. In accordance with embodiments of the invention. The server computer 112 may also host and run a data storage device 106B and software program 108B. As will be discussed with reference to FIG. 5, the server computer 112 may include internal components 1302*b* and external components 1304*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the data gathering module program 110A, 110B may be a program capable of identifying factors in a textual interaction and predicting whether alternative paths of communications may result in quicker issue resolution. The system 120 is explained in further detail below with respect to FIGS. 2-7.

Figure 2:
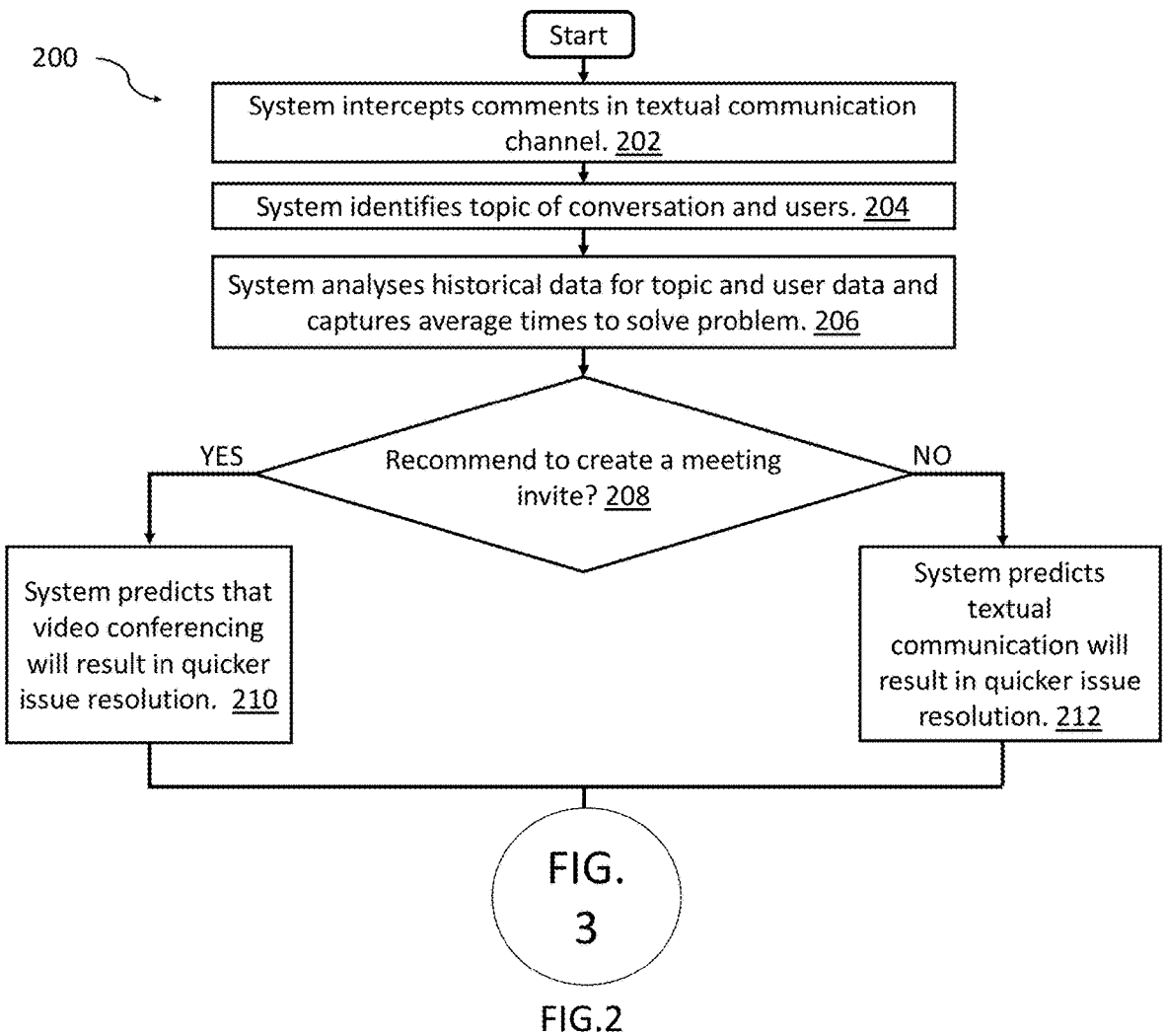
FIG. 2 illustrates a process flowchart for predicting alternative communication based on textual analysis according to at least one embodiment.

Referring now to FIG. 2, an operational flowchart illustrating a process flow for system 120 is depicted according to at least one embodiment. At 202, the system 120 intercepts comments in a textual communication channel by means of the gathering module 110A, 110B. Two or more participants maybe engaged in textual communication. Data can be captured by keyboard or screen capture. Textual communication can be capture prior to the user sending the communication.

At 204, the system 120 identifies the topic of conversation. The system 120 utilizes the data gathering module 110 to identify topic and user information by means of textual and sentiment analysis. Textual and sentiment analysis identifies the topic and participants in the captured text, including topic, user knowledge, and indications of urgency or frustration, for example.

At 206, the system 120 analyses historical data for topic and user data and captures average times for resolving similar issues. The text identified in 202 and analyzed in 204 can be processed by the neural network machine learning model, building a feedback loop based on best results. The identified factors of 204 will be processed through the knowledge corpus to identify matches with branches of clustered data in the knowledge corpus. The model will use the factors to predict issue resolution time. The data can be organized by weights assigned to the different factors. Factor weights are assigned initial conditions and then continuously altered using back propagation technique. For instance, in a conversation between a server engineer and another participant, the system 120 can identify, based on the entity relationship, that the question relates to servers. The system 120 can identify that the server engineer is familiar with the server issue, so that his knowledge level can be weighted heavily. For instance, the system 120 may recognize that the server engineer is linked to this issue 90% of the time. The model will use the relationship and weights to direct the system 120 to look at the branch of historic data related to server issues and the server engineer. The data related to this issue will then be inputted back into the feedback loop to affect future decisions.

At 208, the system 120 determines whether to recommend creating a meeting invite. If the model determines from the historic data in the knowledge corpus that telephone or video conferencing or a personal meeting would lead to quick issue resolution (at 210, "YES" branch), the model may continue to step 210 where the system 120 predicts that video conferencing will result in time saved. If the model determines that no, or miniscule, time would be saved by a telephone or video conference and that textual analysis would be just as effective for issue resolution (at 212, "NO" branch), the data model may continue to 212 where the system 120 predicts that textual communication will save time and sends a continuation notification.

At 210, the system 120 predicts that video conferencing will result in quicker issue resolution. This prediction can be based on the tracked data and/or training data and preferential data of the user in context with its interaction with the topic. For instance, the issue between the server engineer and the other participant will determine that a video or telephone call will result in quicker issues resolution based on historic data showing such. The system 120 analyzes the data to determine that time would be saved if the users were to use video conferencing or telephone communications. The system continues to FIG. 3.

At 212, the system 120 predicts that textual communication will result in quicker issue resolution. The system 120 analyzes the data to make a prediction based on the historic data that was used to train the model. In this situation the model will show that minimum or no time would be saved by the video or telephone conferencing. The system continues to FIG. 3.

Figure 3:
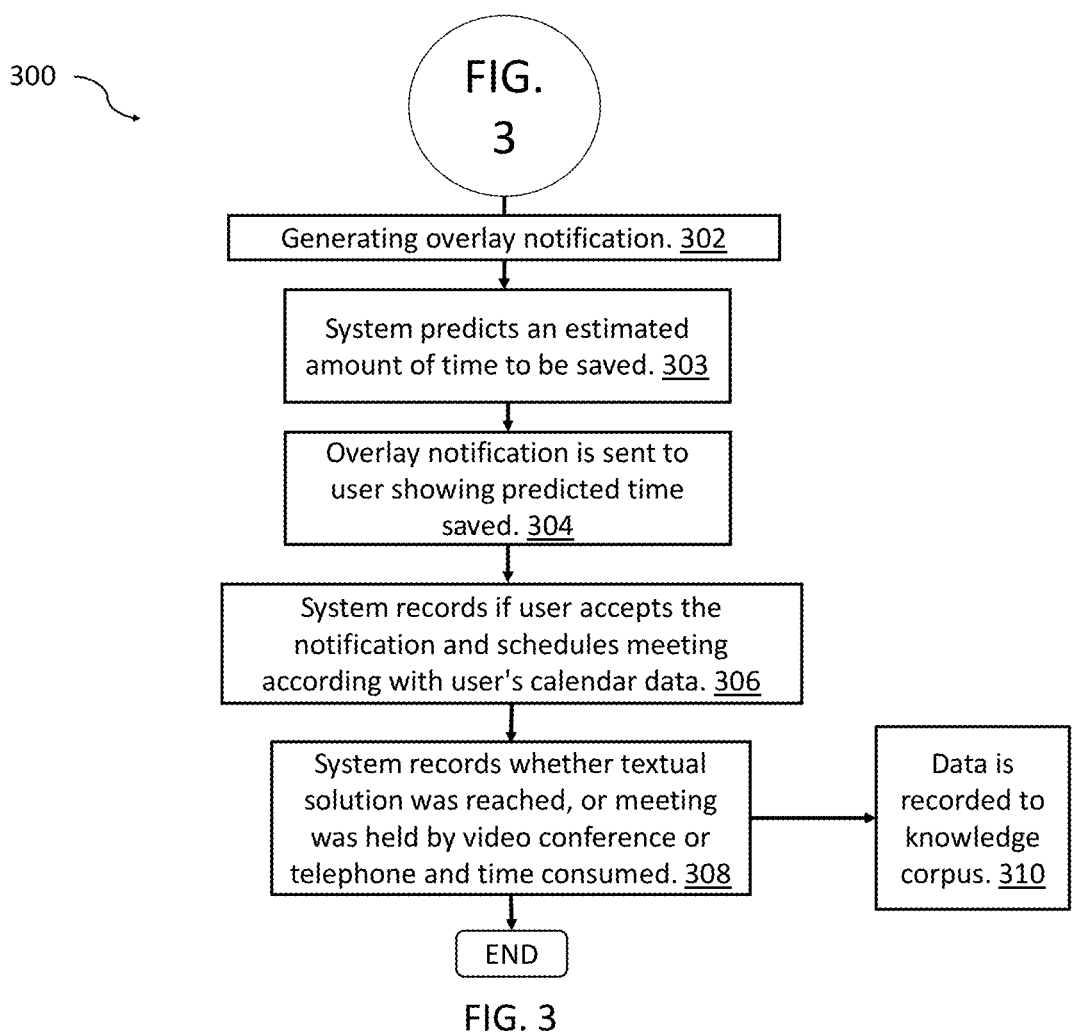
FIG. 3 illustrates a continued process flowchart for predicting alternative communication based on textual analysis according to at least one embodiment.

Referring now to FIG. 3, a continued process flowchart for predicting alternative communication based on textual analysis 300 according to at least one embodiment. At 302 the system 120 generates an overlay notification. The overlay notification will display a recommendation of how to proceed that will result in quicker issue resolution based on the previous steps of the flowchart.

At 303 the system 120 predicts an estimated amount of time that may be saved by changing to an alternative communication method. The system 120 utilizes tracked data and/or training data as well as preferential data to determine the estimated time. Tracked data related to similar instances will allow the system to gage an estimated time for resolution related to specific topics or conversation participants. Time predicted can be estimated by averaging several past recorded times such as, user times to read and send emails and times between conversations on video conferencing or telephone calls. The system will gage time based on initiation and end of the communication. For textual communications, the system 120 may us a count of a number of texts/emails in the communication chain. When no more exchanges are detected over a defined period of time, the system 120 assumes that the end is reached. Sentiment analysis may indicate whether or not the communication chain resulted in a positive resolution. Over time, the system 120 will have recorded data related to time for a temporal analysis that can determine the fastest paths of resolution for certain issues.

At 304 the system 120 sends the overlay notification to the participants showing the predicted time saved. The overlay notification includes the predicted communication path that would save the most time, and an estimated amount of time the predicted path may save. All participants receive the same overlay notification. The overlay will have an option to approve the prediction or ignore it.

At 306 the system 120 records if the participants accept the notification and, if so, schedules a meeting according with the participants' calendar data. The system 120 will have integration between the textual communication systems and the calendar/meeting system, thereby allowing the system 120 to recognize availability of the different participants. All participants must accept the prediction in order for the conference to be scheduled.

At 308 the system 120 records whether textual resolution was reached, or meeting was held by video conference or telephone, and the time consumed. If video conferencing is predicted, the system 120 can record if the participants hold a video conference. If the participants choose to use telephone communications, the system 120 can identify and record whether a phone conference had occurred. In situations where video conferencing or telephone communication are had the system 120 will utilize textual analysis in subsequent communication for textual or sentimental pointers to successful conclusion. Where there is no subsequent communication the system 120 can assume and record a successful conclusion to the issue. The system then continues to 310 and ends.

At 310 the system 120 records in the knowledge corpus, the data of all the previous interactions, including capturing the topic, user knowledge level, user sentiment, time related to past interactions and outcomes of past interactions of a textual communication. The time of all the interactions can be recorded to the knowledge corpus for use in the feedback loop for building and improving the model for preferred outcomes in future runs. This leverages and trains the system for future runs of similar interactions.

Figure 4:
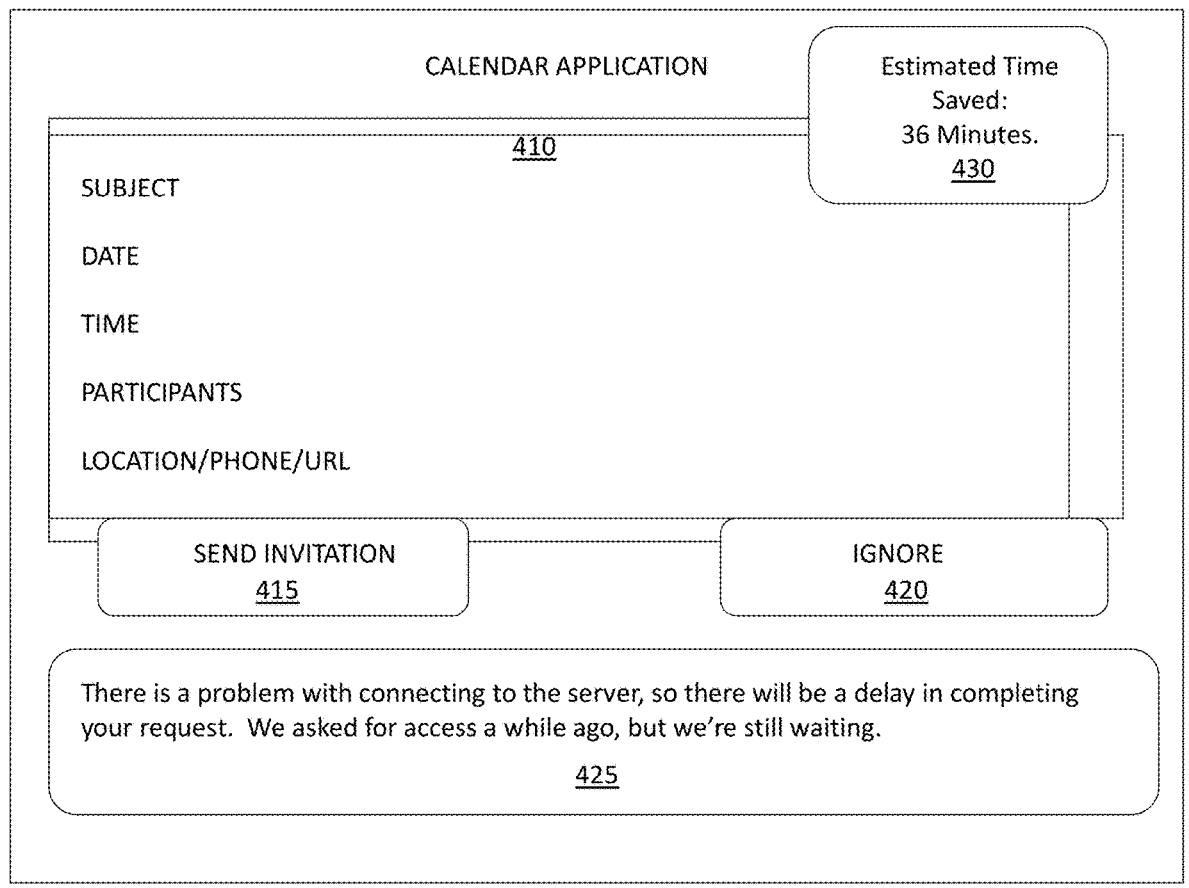
FIG. 4 illustrates an overlay display generated for predicting alternative communication based on textual analysis according to at least one embodiment.

Referring now to FIG. 4, an overlay display 400 generated for predicting alternative communication is illustrated. The overlay presents the prediction made by the model to the participants. The information box 410 can display information regarding the subject of the communication, the date and time, the participants involved and the location link or phone call number of the proposed conference.

The invitation option 415 can display an invitation option. This allows participants to accept the prediction and schedule a conference with the other participants. All other participants must accept the prediction in order for the system 120 to generate a conference invite. By selecting the 420 option the participants may choose to ignore the prediction and continue with textual communication. In the text box 425, participants may display messages related to the issue. An estimated time saved can be displayed in the message box 430. The proposed time to be saved can be calculated based on historic data in the knowledge corpus and the past interactions that have trained the model.

Figure 5:
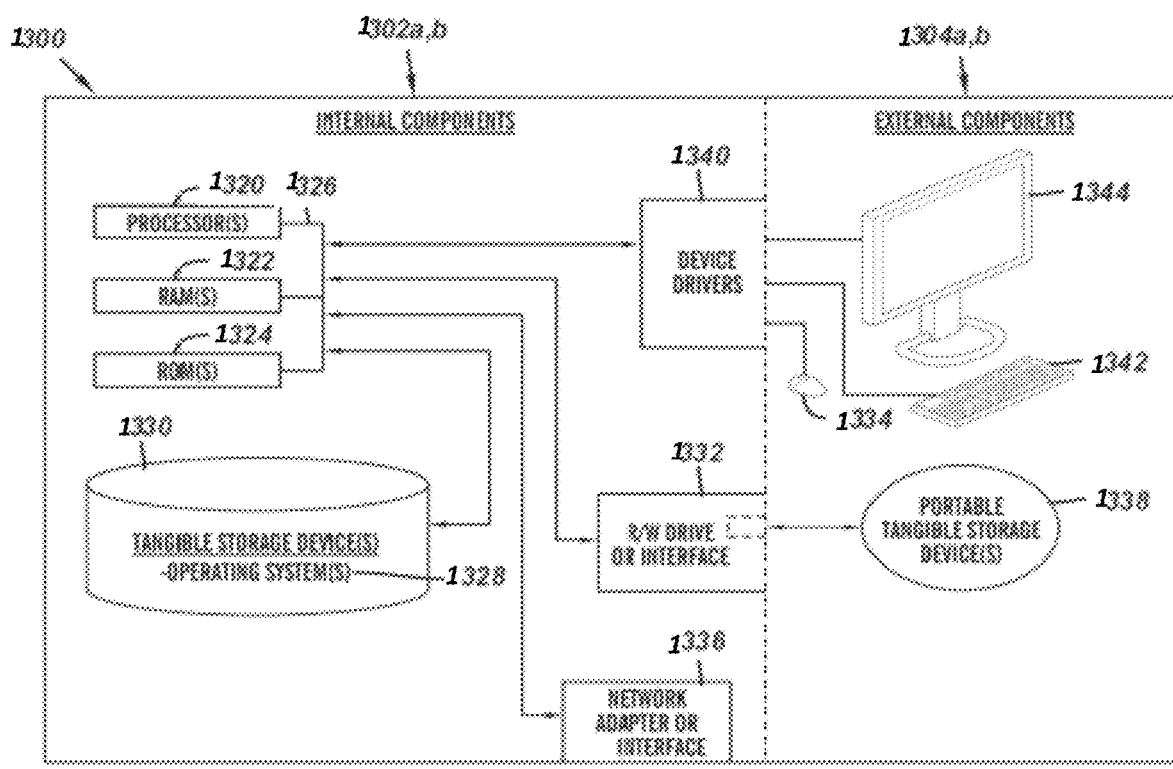
FIG. 5 illustrates a block diagram of components of a computing device of the system for predicting alternative communication based on textual analysis of FIG. 1 according to at least one embodiment.

FIG. 5 shows a block diagram 1300 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 1302, 1304 can represent any electronic device capable of executing machine-readable program instructions. The data processing system 1302, 1304 may be representative of a smart phone, a computer system, PDA, or other electronic devices. Examples of computing systems, environments, and/or configurations that may represented by the data processing system 1302, 1304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 1302a,b and external components 1304a,b illustrated in FIG. 5. Each of the sets of internal components 1302a,b include one or more processors 1320, one or more computer-readable RAMs 1322, and one or more computer-readable ROMs 1324 on one or more buses 1326, and one or more operating systems 1328 and one or more computer-readable tangible storage devices 1330. The one or more operating systems 1328, the software program 108A, 108B and the data gathering module 110A in the client computing device 102, and the data gathering module 110B in the server 112 are stored on one or more of the respective computer-readable tangible storage devices 1330 for execution by one or more of the respective processors 1320 via one or more of the respective RAMs 1322 (which typically include each memory). In the embodiment illustrated in FIG. 5, each of the computer-readable tangible storage devices 1330 is a magnetic disk storage device of an internal hard drive. Alternatively, each of the computer-readable tangible storage devices 1330 is a semiconductor storage device such as ROM 1324, EPROM, flash memory or any other computer-readable tangible storage device that can store a computer program and digital information.

Each set of internal components 1302a,b also includes a R/W drive or interface 1332 to read from and write to one or more portable computer-readable tangible storage devices 1338 such as a CD-ROM, DVD, memory stick, magnetic tape, magnetic disk, optical disk or semiconductor storage device. A software program, such as the data gathering program 110A, 110B, can be stored on one or more of the respective portable computer-readable tangible storage devices 1338, read via the respective R/W drive or interface 1332, and loaded into the respective hard drive 1330.

Each set of internal components 1302a,b also includes network adapters or interfaces 1336 such as a TCP/IP adapter cards, wireless Wi-Fi interface cards, or 3G or 4G wireless interface cards or other wired or wireless communication links. The software program 108 and the data gathering module 110A in the client computing device 102 and the data gathering module 110B in the server 112 can be downloaded to the client computing device 102 and the server 112 from an external computer via a network (for example, the Internet, a local area network or other, wide area network) and respective network adapters or interfaces 1336. From the network adapters or interfaces 1336, the software program 108 and the data gathering module 110A in the client computing device 102 and the data gathering module 110B in the server 112 are loaded into the respective hard drive 1330. The network may comprise copper wires, optical fibers, wireless transmission, routers, firewalls, switches, gateway computers and/or edge servers.

Each of the sets of external components 1304a,b can include a computer display monitor 1344, a keyboard 1342, and a computer mouse 1334. External components 1304a,b can also include touch screens, virtual keyboards, touch pads, pointing devices, and other human interface devices. Each of the sets of internal components 1302a,b also includes device drivers 1340 to interface to computer display monitor 1344, keyboard 1342, and computer mouse 1334. The device drivers 1340, R/W drive or interface 1332, and network adapter or interface 336 comprise hardware and software (stored in storage device 1330 and/or ROM 1324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
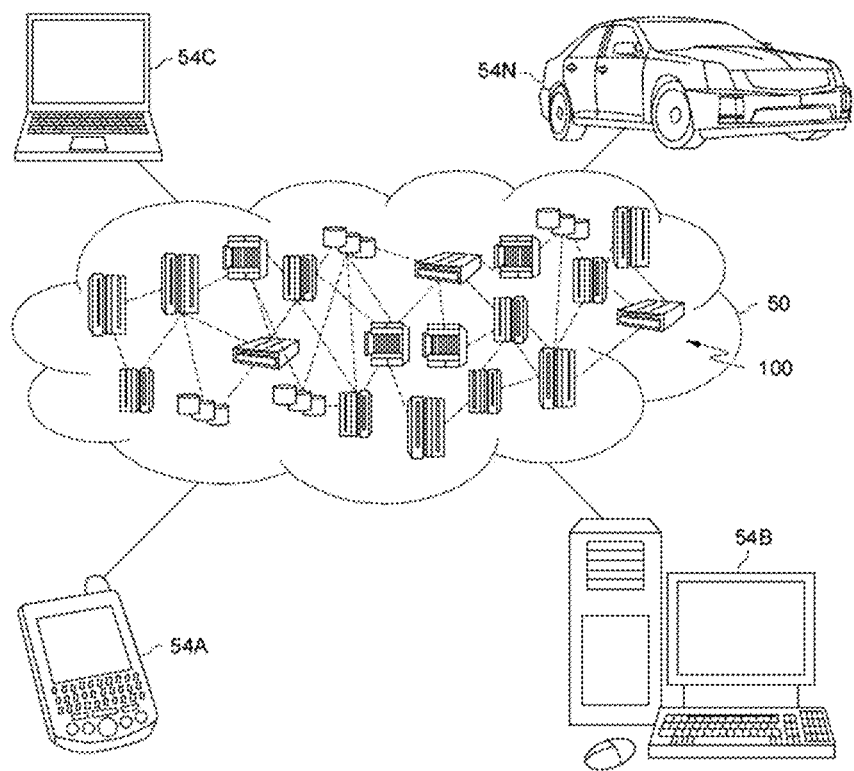
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
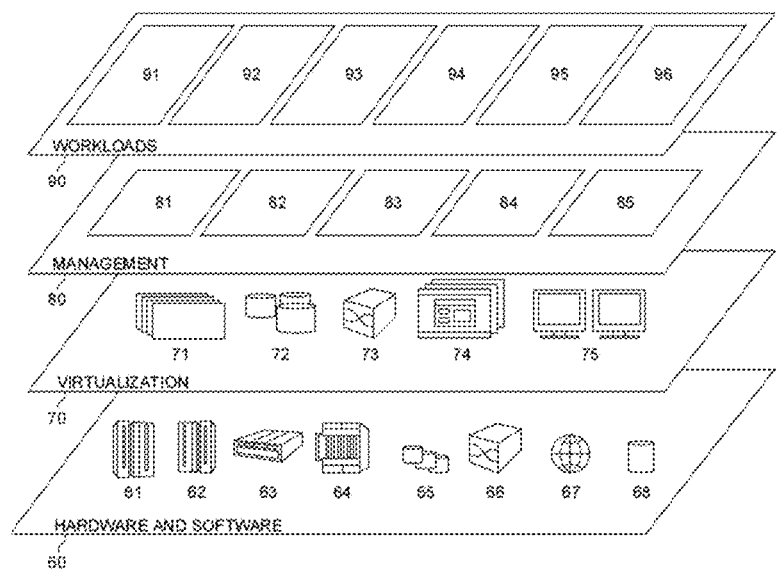
FIG. 7 depicts abstraction model layers according to an embodiment of the present invention.

Referring now to FIG. 7, a set of functional abstraction layers 500 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system for predicting alternative communication 96. The system for predicting alternative communication 96 may relate to building a model of past communications including textual and non-textual, analyzing a textual communication among participants to determine the topic of the communication and knowledge role of the participants, and predicting by the model whether an alternate form of communication, e.g., conference call, may result in quicker resolution than continuing textual communication.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for predicting alternative communications based on textual analysis, the method comprising:
   building, by machine learning, a model to predict an optimal communication method, wherein the building includes training the model on a knowledge corpus of historic data and user data, and results of previous predictions in similar circumstances;
   intercepting textual communication in real time between a plurality of participants within communication channels, wherein the intercepting is selected from the group consisting of a keyboard capture, a screen capture, or both, the keyboard capture and the screen capture;
   identifying, by pattern analysis, sentiment analysis, and textual analysis, topics, sentiments, and the plurality of participants within the intercepted textual communication;
   predicting, by the model, the optimal communication method; and
   generating an overlay notification for the plurality of participants, based on the predicted optimal communication method being other than continuing the textual communication, wherein the generated overlay notification is configured to enable the plurality of participants to accept or reject the predicted optimal communication method.

2. The method of claim 1, further comprising:
   based on the plurality of participants accepting the predicted optimal communication method, generating calendar entries for each participant; and
   based on the plurality of participants rejecting the predicted optimal communication method, continuing the textual communication.

3. The method of claim 1, wherein the knowledge corpus is stored in a cloud computing segment by topic, wherein the topic is determined by topical analysis of the knowledge corpus, and wherein a pointer is stored in the knowledge corpus to point to the corresponding cloud computing segment storing the topic.

4. The method of claim 1, wherein the knowledge corpus initially includes enterprise repositories, wherein the enterprise repositories comprise email archives, technical problem reports, and employee online directories, and wherein the knowledge corpus is updated through a feedback loop with data describing factors identified in previous interactions between different participants, an amount of time for each interaction, and whether the optimal communication method was accepted or rejected.

5. The method of claim 4, wherein the factors identified in the previous interactions are selected from the group consisting of topic, area of expertise of the plurality of participants, length of time to resolve past similar issues, method of communication, and whether the resolution was successful.

6. The method of claim 4, wherein the factors are assigned weights that are fine-tuned by a back-propagation technique based on error rates obtained in previous runs of the method.

7. The method of claim 1, wherein a time saved measurement is determined by averaging past recorded times, wherein the past recorded times are selected from the group consisting of user time to read email, user time to send emails, and total elapsed time between conversations.

8. A computer system for predicting alternative communications for time saving in issue resolution, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   building, by machine learning, a model to predict an optimal communication method, wherein the building includes training the model on a knowledge corpus of historic data and user data, and results of previous predictions in similar circumstances;
   intercepting textual communication in real time between a plurality of participants within communication channels, wherein the intercepting is selected from the group consisting of a keyboard capture, a screen capture, or both, the keyboard capture and the screen capture;

identifying, by pattern analysis, sentiment analysis, and textual analysis, topics, sentiments, and the plurality of participants within the intercepted textual communication;

predicting, by the model, the optimal communication method; and generating an overlay notification for the plurality of participants, based on the predicted optimal communication method being other than continuing the textual communication, wherein the generated overlay notification is configured to enable the plurality of participants to accept or reject the predicted optimal communication method.

9. The computer system of claim 8, further comprising:

based on the plurality of participants accepting the predicted optimal communication method, generating calendar entries for each participant; and based on the plurality of participants rejecting the predicted optimal communication method, continuing the textual communication.

10. The computer system of claim 8, wherein the knowledge corpus is stored in a cloud computing segment by topic, wherein the topic is determined by topical analysis of the knowledge corpus, and wherein a pointer is stored in the knowledge corpus to point to the corresponding cloud computing segment storing the topic.

11. The computer system of claim 8, wherein the knowledge corpus initially includes enterprise repositories, wherein the enterprise repositories comprise email archives, technical problem reports, and employee online directories, and wherein the knowledge corpus is updated through a feedback loop with data describing factors identified in previous interactions between different participants, an amount of time for each interaction, and whether the optimal communication method was accepted or rejected.

12. The computer system of claim 11, wherein the factors identified in the previous interactions are selected from the group consisting of topic, area of expertise of the plurality of participants, length of time to resolve past similar issues, method of communication, and whether the resolution was successful.

13. The computer system of claim 11, wherein the factors are assigned weights that are fine-tuned by a back-propagation technique based on error rates obtained in previous runs of the method.

14. The computer system of claim 8, wherein a time saved measurement is determined by averaging past recorded times, wherein the past recorded times are selected from the group consisting of user time to read email, user time to send emails, and total elapsed time between conversations.

15. A computer program product for predicting alternative communications for time saving in issue resolution, the computer program product comprising:

one or more computer-readable tangible storage medium and program instructions stored on at least one of the one or more tangible storage medium, the program instructions executable by a processor, the program instructions comprising:

building, by machine learning, a model to predict an optimal communication method, wherein the building includes training the model on a knowledge corpus of historic data and user data, and results of previous predictions in similar circumstances;

intercepting textual communication in real time between a plurality of participants within communication channels, wherein the intercepting is selected from the group consisting of a keyboard capture, a screen capture, or both, the keyboard capture and the screen capture;

identifying, by pattern analysis, sentiment analysis, and textual analysis, topics, sentiments, and the plurality of participants within the intercepted textual communication;

predicting, by the model, the optimal communication method; and generating an overlay notification for the plurality of participants, based on the predicted optimal communication method being other than continuing the textual communication, wherein the generated overlay notification is configured to enable the plurality of participants to accept or reject the predicted optimal communication method.

16. The computer program product 15, further comprising:

based on the plurality of participants accepting the predicted optimal communication method, generating calendar entries for each participant; and based on the plurality of participants rejecting the predicted optimal communication method, continuing the textual communication.

17. The computer program product 15, wherein the knowledge corpus is stored in a cloud computing segment by topic, wherein the topic is determined by topical analysis of the knowledge corpus, and wherein a pointer is stored in the knowledge corpus to point to the corresponding cloud computing segment storing the topic.

18. The computer program product 15, wherein the knowledge corpus initially includes enterprise repositories, wherein the enterprise repositories comprise email archives, technical problem reports, and employee online directories, and wherein the knowledge corpus is updated through a feedback loop with data describing factors identified in previous interactions between different participants, an amount of time for each interaction, and whether the optimal communication method was accepted or rejected.

19. The computer program product 18, wherein the factors identified in the previous interactions are selected from the group consisting of topic, area of expertise of the plurality of participants, length of time to resolve past similar issues, method of communication, and whether the resolution was successful; and wherein the factors are assigned weights that are fine-tuned by a back-propagation technique based on error rates obtained in previous runs of the method.

20. The computer program product 15, wherein a time saved measurement is determined by averaging past recorded times, wherein the past recorded times are selected from the group consisting of user time to read email, user time to send emails, and total elapsed time between conversations.

* * * * *